United States Patent [19]

Miyazaki

[11] Patent Number: 4,784,463
[45] Date of Patent: Nov. 15, 1988

[54] ENDOSCOPE APPARATUS HOLDING APPARATUS

[75] Inventor: Atsushi Miyazaki, Hachioji, Japan

[73] Assignee: Olympus Optical Co., Ltd., Tokyo, Japan

[21] Appl. No.: 22,295

[22] Filed: Mar. 5, 1987

[30] Foreign Application Priority Data

Mar. 7, 1986 [JP] Japan .................. 61-32681[U]
Sep. 17, 1986 [JP] Japan .................. 61-143388[U]

[51] Int. Cl.$^4$ .................. G02B 23/26; G01N 21/16; A61B 1/00
[52] U.S. Cl. .................. 350/96.26; 350/96.25; 350/96.20; 350/96.10; 350/574; 350/577; 356/241; 128/4; 128/6
[58] Field of Search .................. 350/96.10, 96.24, 96.20, 350/96.25, 96.22, 96.26, 574, 577, 578, 518, 563; 356/241; 128/4, 6; 362/32

[56] References Cited

U.S. PATENT DOCUMENTS

| | | | |
|---|---|---|---|
| 4,011,017 | 3/1977 | Feuerstein .................. | 356/241 |
| 4,078,864 | 3/1978 | Howell .................. | 356/241 X |
| 4,207,873 | 6/1980 | Kruy .................. | 128/6 |
| 4,298,312 | 11/1981 | MacKenzie et al. .................. | 350/96.26 X |
| 4,390,012 | 6/1983 | Mizumoto .................. | 350/96.26 X |
| 4,530,568 | 7/1985 | Haduch et al. .................. | 350/96.26 |
| 4,575,185 | 3/1986 | Wentzell et al. .................. | 350/96.26 |
| 4,640,124 | 2/1987 | Diener et al. .................. | 350/96.26 X |
| 4,659,195 | 4/1987 | D'Amelio et al. .................. | 350/574 |
| 4,686,963 | 8/1987 | Cohen et al. .................. | 128/4 |
| 4,688,554 | 8/1987 | Habib .................. | 128/4 |
| 4,688,555 | 8/1987 | Wardle .................. | 128/4 |
| 4,696,544 | 9/1987 | Costella .................. | 350/96.26 |
| 4,699,463 | 10/1987 | D'Amelio et al. .................. | 350/96.26 |
| 4,711,524 | 12/1987 | Morey et al. .................. | 350/96.25 |
| 4,721,098 | 1/1988 | Watanabe .................. | 350/96.26 X |

FOREIGN PATENT DOCUMENTS 60-500735 5/1985 Japan .................. 350/96.26 X
1559185 1/1980 United Kingdom .................. 356/241

Primary Examiner—William L. Sikes
Assistant Examiner—Brian M. Healy
Attorney, Agent, or Firm—Armstrong, Nikaido, Marmelstein & Kubovcik

[57] ABSTRACT

An endoscope apparatus holding apparatus provided with an attaching means detachably attachable to such object to be inspected as a jet engine, a holding means for holding an endoscope or an endoscope insertion assisting means through which the endoscope is inserted and a means for adjusting the distance between the holding means and attaching means so as to be able to inspect the object position with a simple operation.

17 Claims, 8 Drawing Sheets

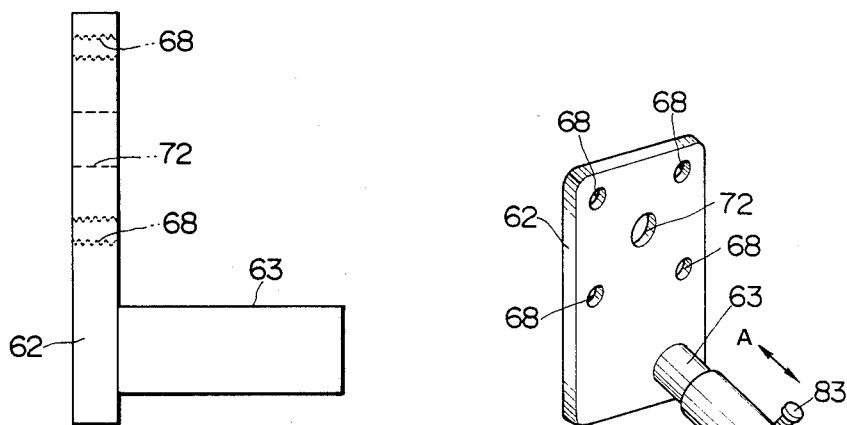
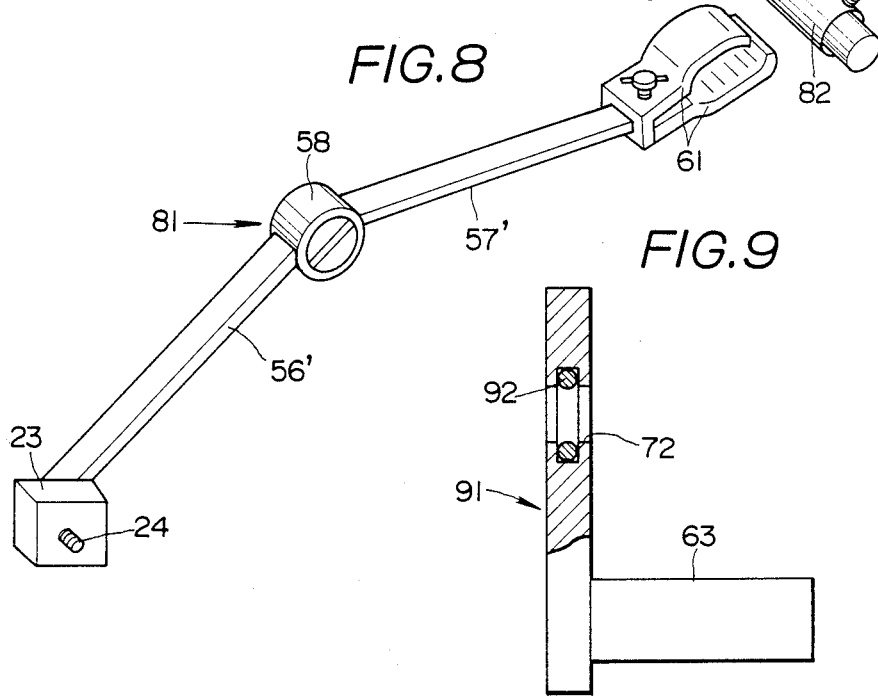

ENDOSCOPE APPARATUS HOLDING APPARATUS

BACKGROUND OF THE INVENTION

1. Field of the Invention and Related Art Statement:

This invention relates to an endoscope apparatus holding apparatus provided with an attaching means for movably holding the endoscope apparatus side.

Recently, there has come to be extensively used an endoscope which is to be inserted in the elongated insertion part into a body cavity or pipe cavity to observe the interior of the cavity so that an affected part may be diagnosed or a damage or the like may be inspected.

The insertion part of the above mentioned endoscope is made flexible so as to be insertable even through a bent insertion course. However, due to this flexibility, the tip side will not be fixed in the direction and will be difficult to introduce in the object direction in some case.

Therefore, in a prior art example disclosed in the gazette of West German Patent Laid Open No. DE 3405541A1, corresponding to U.S. Pat. No. 4,640,124, a hollow shaft which can be passed through an endoscope is provided so that the insertion part of the endoscope may be projected out of an opening on the tip side of this shaft and the interior of an engine or the like may be inspected by using an endoscope insertion assisting means provided with a curving means on the holding side.

In inspecting such observed body complicated in the interior as the above mentioned engine, the attaching part of the above mentioned assisting means has been fixed on such selected proper place as a projection or the like on the outer periphery of the engine.

By thus fixing it, the assisting means or the endoscope inserted through it can be prevented from swinging or the like and therefore the position to be inspected opposed to the objective optical system on the tip side of the insertion part can be positively observed.

However, if the assisting means is thus fixed, the range which can be observed or inspected in such state will be restricted and the position to be inspected will not be able to be covered in some cases.

On the other hand, in U.S. Pat. No. 4,428,820 (Japanese Patent Laid Open No. 500735/1985), there is disclosed an endoscope having a curving mechanism of two steps in which the second curvable part is made rigid so as to be able to be self-erected so that the endoscope may be used even within an engine.

However, this prior art example is not provided with an endoscope fixing means and therefore has a defect that, in the case of the curving operation on the holding side, the endoscope will be likely to vibrate to make the observation or inspection difficult. Also, in the case of photographing by fitting such photographing apparatus as a camera or television camera, the picture surface will be likely to vibrate to make it difficult to obtain an image easy to see.

OBJECTS AND SUMMARY OF THE INVENTION

An object of the present invention is to provide an endoscope apparatus holding apparatus which can be used in a wide range even in such complicated position to be inspected as within an engine.

Another object of the present invention is to provide an endoscope apparatus holding apparatus which is easy to lead the tip of an endoscope to a position to be inspected.

In the present invention, the holding apparatus can be attached integrally or separately to an endoscope apparatus, has an attaching means to an object to be inspected and is provided with a bending part in an arm part leading to the object to be inspected and with a mechanism of varying the distance between the endoscope body and attaching means so that a wide range may be observed without changing the fixing position.

BRIEF DESCRIPTION OF THE DRAWINGS

FIGS. 1 to 7 relate to the first embodiment of the present invention.

FIG. 1 is a perspective view showing the manner of attaching the first embodiment to a jet engine to be observed.

FIG. 2 is a sectioned view showing an endoscope insertion assisting means to be fitted to the first embodiment.

FIG. 3 is a sectioned view on line A—A' in FIG. 2.

FIG. 4 is a sectioned view on line B—B' in FIG. 2.

FIG. 5 is a sectioned view on line C—C' in FIG. 2.

FIG. 6 is a sectioned view on line D—D' in FIG. 2.

FIG. 7 is a side view showing an attaching plate in the first embodiment.

FIG. 8 is a perspective view showing the second embodiment of the present invention.

FIG. 9 is a side view showing an attaching plate in the third embodiment of the present invention.

DETAILED DESCRIPTION OF THE INVENTION

Figure 1:
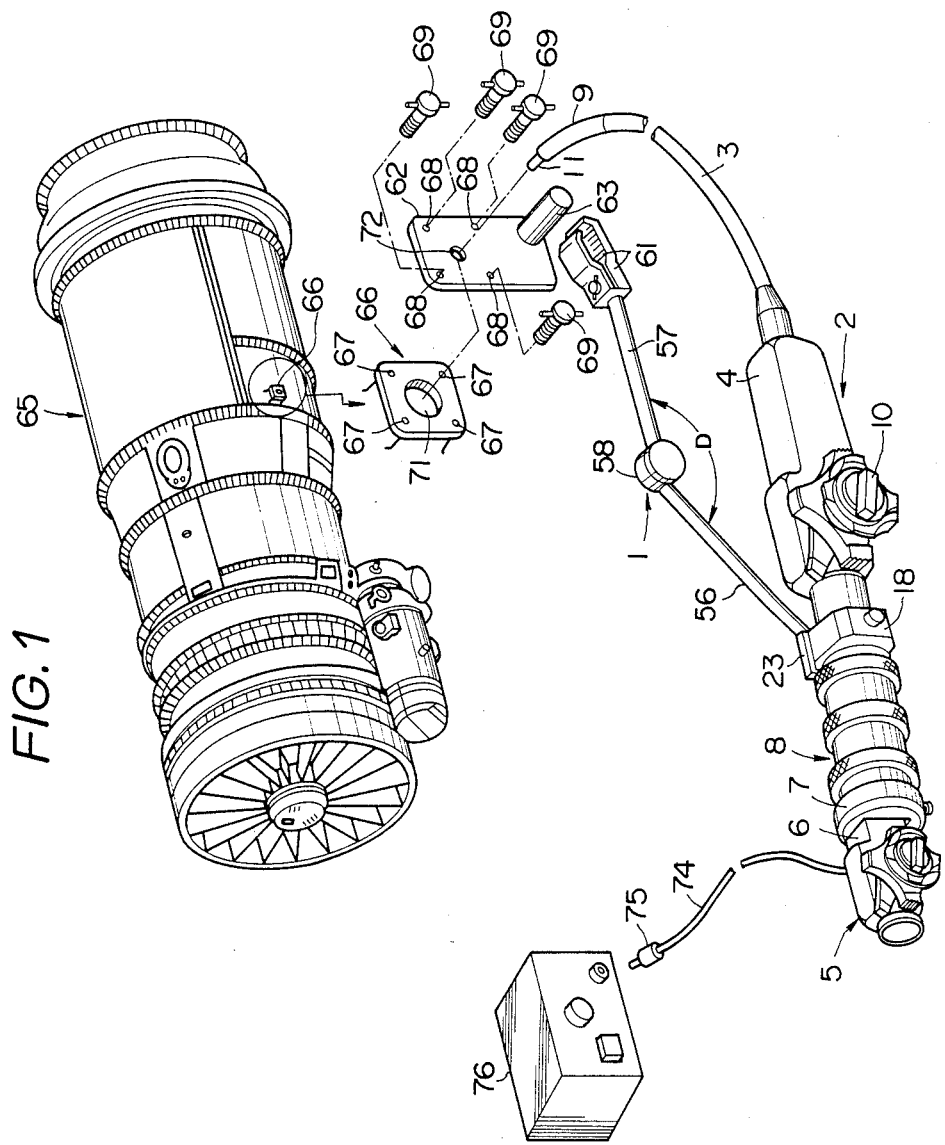

An endoscope insertion assisting means 2 which can be fitted to an endoscope apparatus holding apparatus 1 in the first embodiment is formed as shown in FIG. 1 of an elongated hollow guide tube part 3, a wide (guide tube) operating part 4 provided as connected to the rear end side of this guide tube part 3, an endoscope fitting part 7 formed on the rear end side of this operating part 4 and fitted with an operating part 6 of an endoscope 5 and an endoscope holding part 8 formed between the above mentioned operating part 4 and endoscope fitting part 7 and capable of being extended and contracted.

On the front end side of the above mentioned guide tube part 3, a curvable part 9 is formed by tandem connecting many articulated frames not illustrated which are connected with a mechanism of pulling and relaxing wires within the operating part 4 through wires inserted through the guide tube part 3 so that, by rotating an angle knob 10 provided on the outer surface of the operating part 4, the curvable part 9 may be curved and the tip part 11 side of the endoscope insertion part inserted through the guide tube part 3 may be bent to be led toward an object position.

Figure 2:
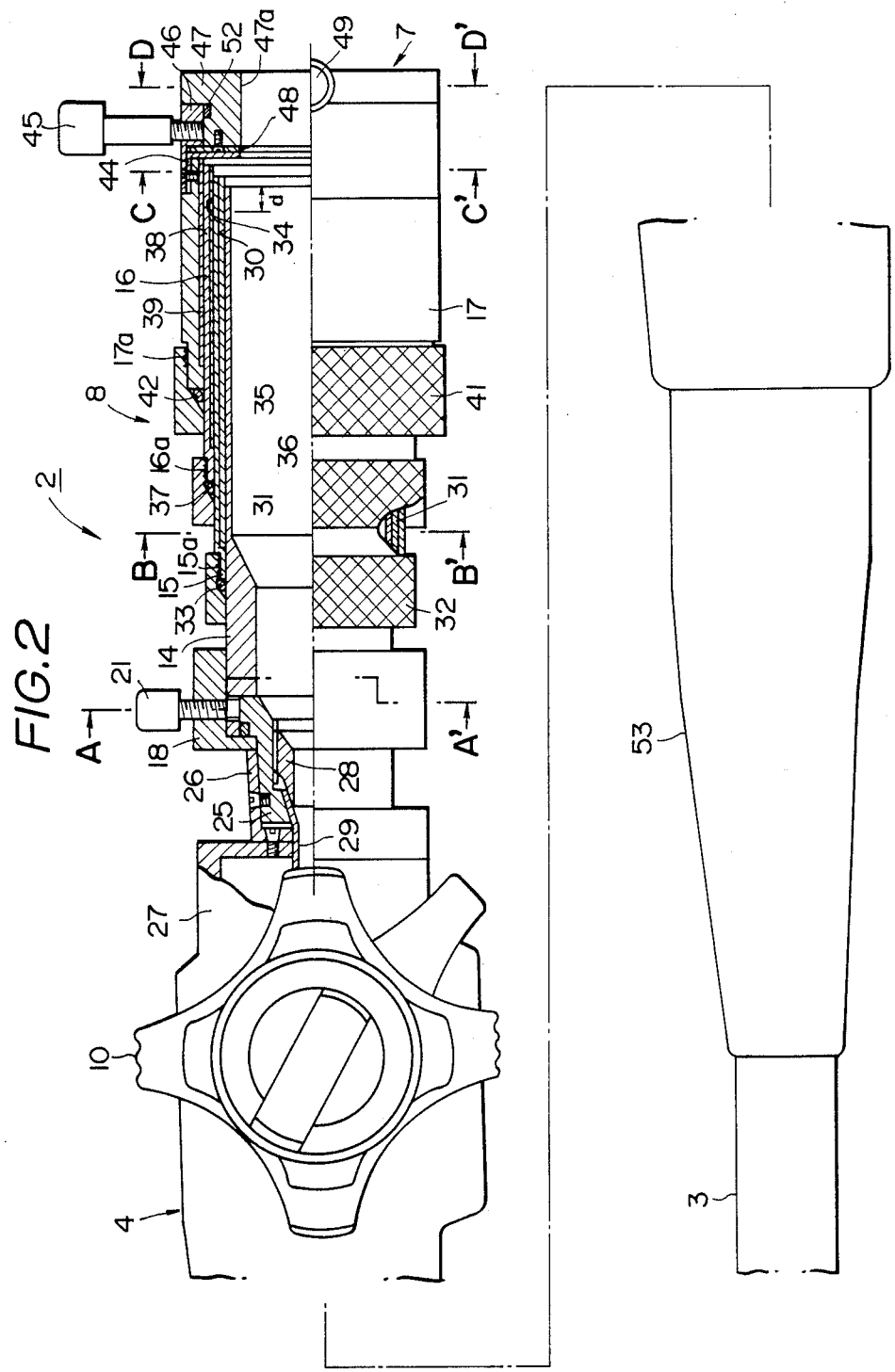

The endoscope holding part 8 of the above mentioned endoscope insertion assisting means 2 is of such structure as is shown, for example, in FIG. 2.

This holding part 8 is made variable over the entire length by sliding, for example, four pipes 14, 15, 16 and 17.

Figure 3:
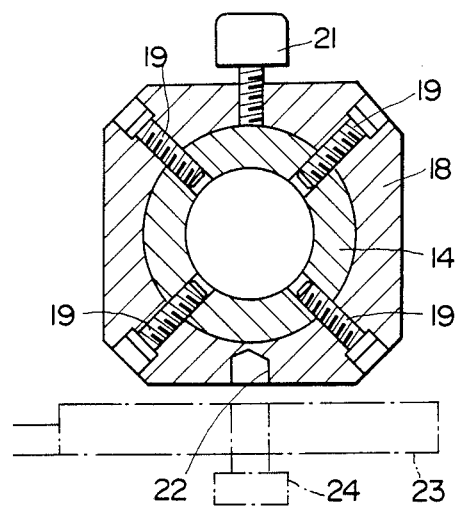

The first pipe 14 is externally fitted with a holding part fixing member 18 on the outer periphery at the front end made thicker. In this fixing member 18, as shown in FIG. 3, screws 19 are screwed respectively into screw holes provided in four places and are engaged on the tip sides with screw holes on the pipe 14 side communicating with the above mentioned respective screw holes so as to be able to fix the pipe 14 to the fixing member 18 so as not to rotate. A grip 21 for stopping the rotation is to engage with the outer peripheral surface of an outside pressing member 25 so as to stop the rotation of the tip side from the outside pressing member 25 of the assisting means. Also, in this stopping member 18, for example, on the other side of the grip 21, as shown in FIG. 3, there is provided a screw hole 22 to which the holding apparatus 1 of the first embodiment can be detachably attached, a fitting plate 23 of the holding apparatus 1 is pressed against the side on which this screw hole 22 is provided so that the holding apparatus 1 may be fixed to the assisting means 2 with a fixing screw 24 attached to this fitting plate 23.

The above mentioned fixing member 18 projects on the front end side inward in the diametrical direction, externally fits an outside pressing member 25 fitting to the inside of the front end of the pipe 14 and contacts on the front surface with the rear end surface of a jointing member 26 so as to be prevented from being pulled out. This jointing member 26 is fixed to the rear end of a body 27 of the operating part 4 through a screw or the like.

On the inner peripheral surface of the above mentioned outside pressing member 25, a female screw is formed, an inside pressing member 28 provided with a male screw to be screwed with this female screw is screwed and a guide tube 29 is fixed as held and pressed between the tapered surfaces of these both pressing members 25 and 28. The inside diameter of this guide tube 29 is made somewhat larger than the outside diameter of the insertion part of the endoscope 5 to be inserted through this guide tube 29. By the way, an O-ring is fitted in the part made steppedly larger in the diameter of the outside pressing member 25.

Figure 4:
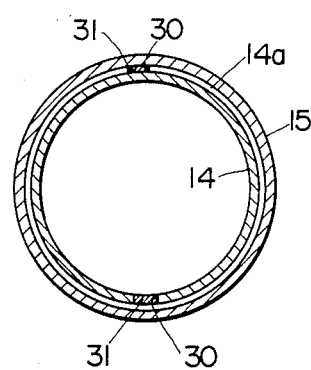

The above mentioned first pipe 14 is fitted into the second pipe 15 so as to be slidable in the lengthwise direction. In this case, so as to be movable without accidentally rotating, the first pipe 14 is steppedly made a little larger in the diameter for a proper length d (See FIG. 2) near the rear end to provide a large diameter part 14a and is provided, as shown in FIG. 4, with key grooves 30 above and below with which are respectively engaged, as shown in FIG. 2 or 4, rectangular keys 31 fitted with screws or the like in the lengthwise direction (forward and rearward direction) of the inner wall of the second pipe 15.

A male screw 15a is formed on the outer periphery of the front end of the above mentioned second pipe 15 so that the fixing ring 32 may be screwed. An O-ring 33 is fitted to a tapered surface inside this fixing ring 32 so that, by enlarging the amount of screwing the fixing ring 32, the O-ring 33 may be pressed inward in the radial direction and the first pipe 14 and second pipe 15 may be prevented by the friction of this pressed O-ring 33 from sliding and may be fixed in any desired length positions.

The same means is formed also for the above mentioned second pipe 15 and third pipe 16.

That is to say, the part near the rear end of the second pipe 15 is made larger in the diameter, is provided with key grooves 34 with which are respectively engaged rectangular keys 35 fitted to the third pipe 16. The second pipe 15 is made slidable forward and rearward as fitted in the third pipe 16. A male screw 16a is formed on the outer periphery of the front end of the third pipe 16 and there is formed a clamping means which can fix the second pipe 15 and third pipe 16 so as not to move forward and rearward by pressing an O-ring 37 fitted inside the tapered inner peripheral surface with a fixing ring 36.

Figure 5:
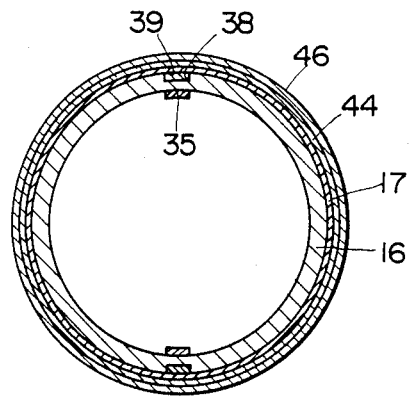

As shown in FIGS. 2 and 5, the third pipe 16 is also made large in the diameter on the outer periphery at the rear end and is provided with key grooves 38 so as to be slidable forward and rearward as containing rectangular keys 39 of the fourth pipe 17. Also, a male screw 17a is formed on the outer periphery at the front end of the fourth pipe 17 so as to be able to be screwed with a fixing ring 41 and the third pipe 16 and fourth pipe 17 can be clamped with each other by pressing an O-ring 42 fitted on the inner periphery of the fixing ring 41.

Now, on the rear end side of the above mentioned fourth pipe 17, there is formed a fitting part 7 provided with a rotary mechanism making the endoscope 5 rotatably fittable.

At the rear end of the fourth pipe 17, a ring 46 incised on the outer periphery and provided with a rotation stopping grip 45 to project by fitting a stopper 44 is fixed in the thin part on the front end side with a screw or the like. This ring 46 projects on the rear end side more rearward than the fourth pipe 17 and is externally fitted in a recess formed on the outer periphery at the front end of a scope holding member 47 forming the fitting part 7. This scope holding member 47 is fixed on the front end surface with a hollow pressing disc 48 and screws. This pressing disc 48 is attached as holding the front and rear surfaces of the ring 46 provided to project with a grip 45 together with the scope holding member 47. The scope holding member 47 side is made rotatable with respect to this ring 46. By the way, the pressing disc 48 prevents the scope holding member 47 from escaping rearward. By rotating the grip 45 provided to project by engaging its screw part with a screw hole of the ring 46 to set the inside tip of the screw part to press the outer surface of the scope holding member 47, the scope holding member 47 rotatable with respect to the pipe 14, 15, 16 or 17 or operating part 4 side can be clamped not to rotate.

Figure 6:
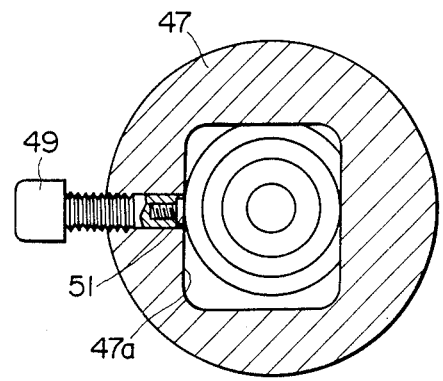

As shown in FIG. 6, the above mentioned scope holding member 47 is provided with a substantially rectangular inner wall surface 47a corresponding to the contour of the operating part 6 of the endoscope 5 so as to be able to be fitted without a backlash.

When the screw part screwed into the screw hole of the scope holding member 47 in the scope pressing grip 49 provided to project in the scope holding member 47 is projected in the inside direction and is pressed through a pressing protective member 51, the endoscope 5 can be fixed by pressing the operating part 6 side of the endoscope 5. By the way, an O-ring 52 is fitted between the scope holding member 47 and the ring 46 provided with the grip 45 to project.

By the way, the front side of the operating part 4 of the above mentioned assisting means 2 is connected with the rear end of the guide tube part 3 protected by a tapered break preventing member 53.

Now, in the holding apparatus 1 of the first embodiment, as shown in FIG. 1, one arm 56 of a pair of arms 56 and 57 is provided to project from the fitting plate 23 detachably attached to the fixing member 18 of the assisting means 2 and is connected at the other end to the other arm 57 through a bendable bending part 58. The bending part 58 forms a means of varying the distance between both ends of the holding apparatus 1 by making the angle D of both arms 56 and 57 variable.

A pair of gripping pieces 61 opened and closed with a screw 59 are attached to the other end of this arm 57. As shown in FIG. 1 or 7, these gripping pieces 61 can be fixed as gripping a fitting bar 63 provided to project on an attaching plate 62. By gripping this fitting bar 63, the assisting means 2 and the endoscope 5 fitted to this assisting means 2 can be held by the attaching plate 62 without any backlash.

The above mentioned attaching plate 62 is provided with screw holes 68 communicating with respective holes 67 of an attaching part 66 of a jet engine 65 as an object to be observed shown, for example, in FIG. 1 as closely fitted to the attaching part 66. The attaching plate 62 can be fixed to the attaching part 66 of the jet engine 65 by respective fixing screws 69.

This attaching plate 62 is provided with an inserting hole 72 which communicates with an observing hole 71 provided in the attaching part 66 of the above mentioned jet engine 65 and through which the guide tube part 3 of the assisting means 2 can be inserted.

By the way, in the endoscope 5 fitted to the above mentioned assisting means 2, as shown in FIG. 1, a light guide cable 74 is extended from its operating part 6 and a connector 75 attached to the tip of this cable 74 can be fitted to a light source device 76.

A using example of the thus formed first embodiment shall be explained in the following with reference to FIG. 1.

In the case of inspecting the interior of the jet engine 65 shown in FIG. 1, if the attaching plate 62 is closely fitted to the attaching part 66 on the jet engine 65 side and the respective screws 69 are screwed, the attaching plate 62 will be able to be firmly fixed to the attaching part 66. By strongly gripping the fitting bar 63 of this attaching plate 62 with the gripping pieces 61, the holding apparatus 1 can be held. By fitting the fitting plate 23 at the end of the arm 56 of this holding apparatus 1 to the fixing member 18 of the assisting means 2, the assisting means 2 and the endoscope 5 fitted to this assisting means 2 can be held without any backlash. The guide tube part 3 of the assisting means 2 fitted with this endoscope 5 can be introduced on the tip side into the jet engine 65 through the inserting hole 72 in the attaching plate 62 and the observing hole 71 on the jet engine 65 side. In such case, when the light guide cable 74 of the endoscope 5 is connected to the light source device 76, an illuminating light can be emitted out of an illuminating window at the insertion part tip 11 and the interior of the jet engine 65 illuminated by this illuminating light can be observed by the observing light source system. In case, for example, the tip 11 is too far from the observing position, if the angle D of both arms 56 and 57 is made smaller by operating the bending part 58 of the holding apparatus 1, the tip part 11 can be made nearer for the observation. As the distance between the position of the assisting means 2 and the position of the attaching plate 62 or attaching part 66 can be varied by varying the angle D of both arms 56 and 57 by rotating the bending part 58, the observing or inspecting place can be simply changed. In the case of fitting a photographing apparatus, a wide part can be continuously observed with a simple operation without any backlash.

By the way, in the above mentioned first embodiment, the fitting bar 63 can be provided on the arm 57 side and the gripping pieces 61 can be provided on the attaching plate 62 side in a modified structure. This can be applied to the other embodiments, too.

FIG. 8 shows a holding apparatus 81 of the second embodiment.

In this second embodiment, the fitting bar 63 provided to project on the attaching plate 62 is externally fitted with a pipe 82 slidable in the lengthwise direction A of this fitting bar 63. This pipe 82 can be fixed to the fitting bar 63 with a screw 83. By the way, the arms 56' and 57' which are columnar in the first embodiment are made pillars rectangular in the cross-section. The others are the same as in the first embodiment.

FIG. 9 shows an attaching plate 91 in the third embodiment of the present invention. In this attaching plate 91, as shown in its sectioned view, an O-ring 92 as a positioning member is fitted in a ring-shaped recess formed in the course of the inserting hole 72. By this O-ring 92, a proper friction force or a force regulating the movement of a pressing force will act on the guide tube part of the endoscope insertion assisting means or endoscope insertion part passed through this inserting hole 72 to prevent it from accidentally slipping and becoming unstable in the position and to reduce fluctuation so as to be able to be held in any position. The others are of the same formation as of the attaching plate of the above mentioned first embodiment.

Figure 10:
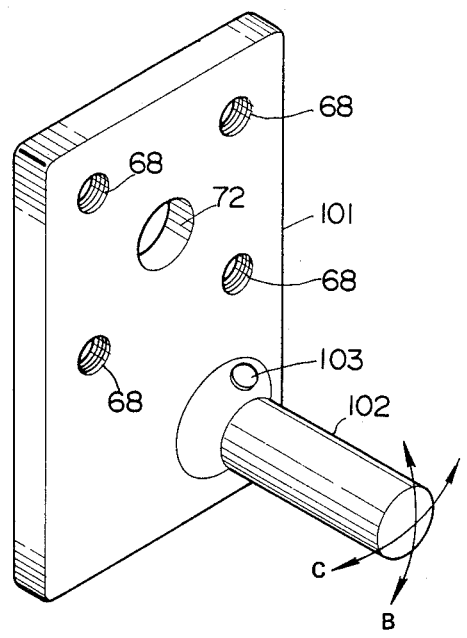
FIG. 10 is a perspective view showing an attaching plate in the fourth embodiment of the present invention.

FIG. 10 shows an attaching plate 101 in the fourth embodiment of the present invention.

In this embodiment, a fitting bar 102 provided to project on the attaching plate 101 is spherical on the base side and is fitted in a spherical recess of the fitting plate 101 so as to be free to swing in the vertical direction B or horizontal direction C and to be able to fix the swinging position. The others are of the same formation as of the above mentioned first embodiment.

Figure 11:
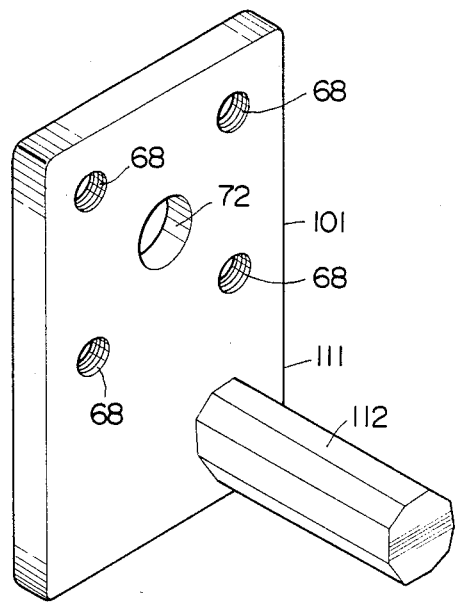
FIG. 11 is a perspective view showing an attaching plate in the fifth embodiment of the present invention.

FIG. 11 shows an attaching plate 111 in the fifth embodiment of the present invention.

A fitting bar 112 provided to project on this attaching plate 111 is a pillar of such polygonal cross-section as, for example, a regular octagonal cross-section so as to be prevented from moving in the peripheral direction when fixed with gripping pieces or the like. The others are of the same formation as of the above mentioned first embodiment.

By the way, in the above described respective embodiments, for example, in the first embodiment, the fitting bar 63 can be provided with knurls on the outer surface so as not to slip when gripped with the gripping pieces 61.

Figure 12:
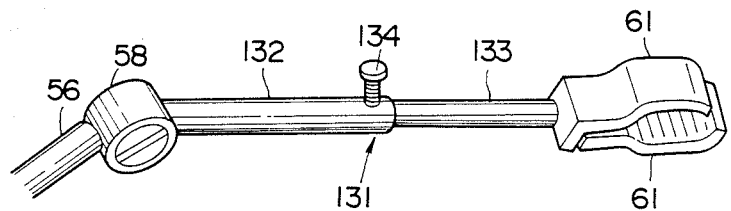
FIG. 12 is a perspective view showing a part of an arm in the sixth embodiment of the present invention.

FIG. 12 shows a part of an arm 131 in the sixth embodiment of the present invention.

In this embodiment, one arm 57 (represented by the reference numeral 131 in this drawing), for example, in the first embodiment consists of a pipe 132 and a pipe (or column) 133 fitted in the pipe 132 and movable in the lengthwise direction and the arm 131 which can be extended and contracted to vary the length can be fixed in the length with a screw 134.

By the way, a bending part which can bend the arms in the direction intersecting at right angles with the bending part 58 may be fitted in the course or the like of the arm (for example, 56).

Figure 13:
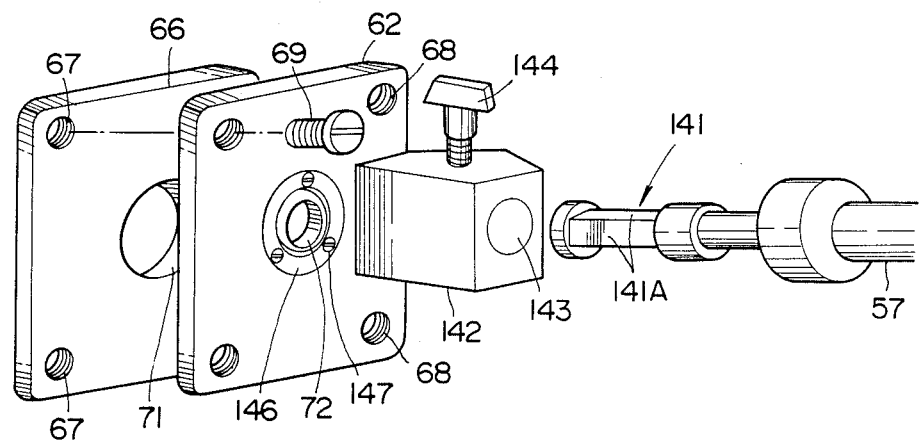
FIG. 13 is a perspective view showing the vicinity of a fitting part of a holding apparatus in the seventh embodiment of the present invention.

FIG. 13 shows an important part of the seventh embodiment of the present invention.

Figure 14:
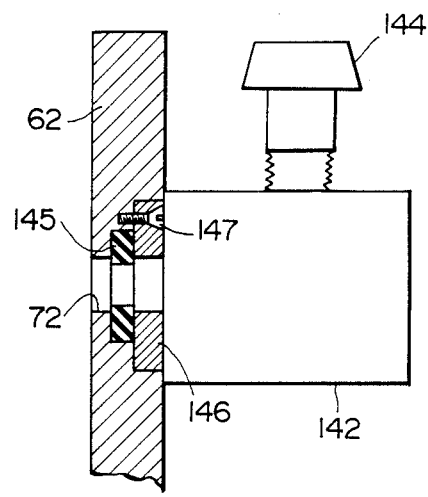
FIG. 14 is a sectioned view showing an attaching plate to be used in the seventh embodiment.

In this embodiment, a connecting bar 141 is used in place of the gripping pieces 61 shown in FIG. 1 in the holding apparatus 1. The connecting bar 141 attached to the tip of the arm 57 is inserted in a holding apparatus fitting hole 143 of a holding apparatus fitting member 142 provided as erected on the attaching plate 62 so as to be able to be removably fixed with a fixing screw 144. By rotating the fixing screw 144 fitted to the above mentioned holding apparatus fitting member 142, the screw 144 projects at the tip into the attaching hole 143 to press and fix a flat part 141A on the connection bar 141. By the way, the outside diameter of a disc and column part at both ends of the flat part 141A is substantially equal to the inside diameter of the attaching hole 143 so that the connecting bar 141 may be fitted in without a backlash. By the way, the number of the flat parts 141A is as many as 4 so as to be of a form easy to fix with the fixing screw 144. The structure of the arm 57 and the like and the other members is the same as in the other embodiments. By the way, as shown in FIG. 14, such elastic disc 145 as an O-ring is fitted in a step part formed in the inserting hole 72 of the attaching plate 62, is prevented by the fixing plate 146 from escaping and is fixed with a screw 147. By the way, the form of the fitting member 142 is not limited to such pillar form of a square cross-section as is shown in FIG. 13 but may be columnar or any other form.

By the way, the formation may be a combination of the above described respective embodiments.

By the way, in the above described embodiments, the holding apparatus can be removably fitted to the endoscope insertion assisting means but may be integrally fixed. Also, the holding apparatus may be removably fitted to the endoscope or may be made integral with the endoscope. The attaching plate to be fitted to an object to be observed is not limited to be of the above described form and structure but can be formed in response to the object to be observed. Also, various attaching plates or the like may be prepared in response to bhe objects to be observed. This attaching means can be made integral with the arm 56 or the like.

Figure 15:
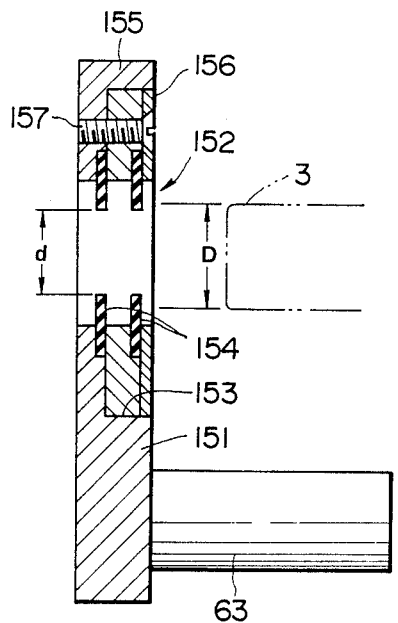
FIG. 15 is a sectioned view showing an attaching plate in the eighth embodiment of the present invention.
Figure 16:
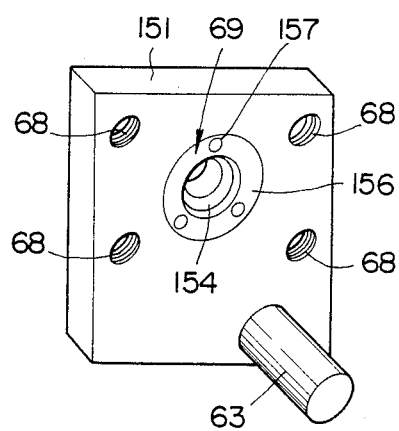
FIG. 16 is a perspective view of an attaching plate in the eighth embodiment.

FIGS. 15 and 16 show an attaching plate used in the eighth embodiment.

In this embodiment, a square or rectangular attaching plate 151 is provided with screw holes 68 communicating, for example, with four respective screw holes 67 of the attaching part 66 as attaching means enabling attaching to the attaching part 66 of the jet engine 65 as an object to be inspected and can be fixed with the fixing screws 69.

Also, the above mentioned attaching plate 151 is provided with an inserting hole 152 communicating with the above mentioned holding apparatus fitting hole 71. The guide tube part 3 inserted through this inserting hole 152 is elastically pressed on the outer periphery so as to be able to be held without a backlash.

A through hole of a diameter larger than the outside diameter of the guide tube part 3 is formed in the center of the four screw holes 68, is incised on the outer peripheral side in the course and has a recess 153 formed to be steppedly expanded in the diameter. This stepped surface is provided with an incision into which is fitted a disc-shaped rubber sheet 154 as a hollow elastic member. This rubber sheet 154 is held at a predetermined spacing from the other rubber sheet 154 through a hollow disc-shaped spacer 155 fitted in the above mentioned recess 153. This spacer 155 is also provided with an incision into which the sheet 154 can be fitted. The above mentioned spacer 155 and the rubber sheets 154 fitted in the incisions of this spacer 155 are covered with a hollow disc-shaped cover 156 in the recess 153 and are fixed, for example, with three screws 157.

The inside diameter d of the rubber sheets 154 as held at a predetermined spacing from each other by the above mentioned spacer 155 is made somewhat smaller than the outside diameter D of the guide tube part 3. On the other hand, the inside diameter of the attaching plate 151, spacer 155 and cover 156 is made larger than the outside diameter of the guide tube part 3 to form the inserting hole 152. As each rubber sheet 154 is formed of a member high in the elasticity, even if its inside diameter d is smaller than the outside diameter D of the guide tube part 3, when pressed, the diameter will be expanded to be able to smoothly pass the guide tube part 3. As two rubber sheets 154 are provided as separated from each other, unless a pressing force is applied, the guide tube part 3 will be held as elastically pressed on the outer periphery and will be fixed without a backlash in these parts. The pressing force can be made smaller than in the case of holding the guide tube part 3 with only one sheet and the guide tube part 3 can be prevented from being damaged.

Figure 17:
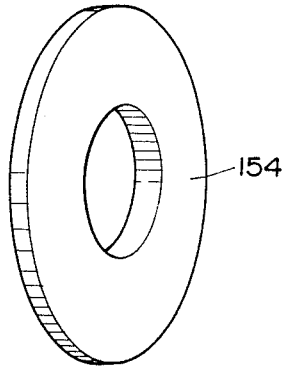
FIG. 17 is a perspective view showing the form of a rubber sheet.

Now, the elastic disc fitted in the inserting hole 152 of the attaching plate 151 is not limited to that shown in FIG. 17 but that of such form as is shown in FIG. 18 may be used.

Figure 18A:
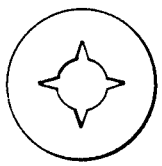
FIG. 18 shows elevations of other embodiments of the rubber sheet in FIG. 17.

The elastic disc shown in FIG. 18a is provided, for example, with four incisions in a circular inserting hole so as to be able to insert the guide tube part 3 and to hold it with a proper pressing force.

Figure 18C:
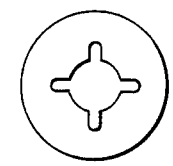
Figure 18B:
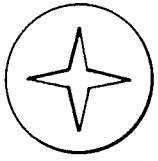
Figure 18D:
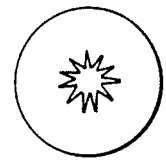

The one shown in FIG. 18b is provided with cruciform incisions. The one in FIG. 18c is provided with the same incisions as in FIG. 18a but the depths of the incisions are rounded. The one shown in FIG. 18d is provided with many radial incisions.

Figure 19:
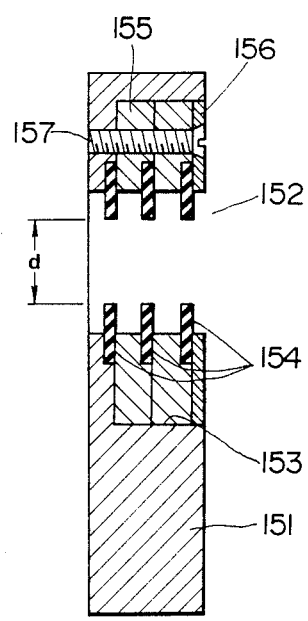
FIG. 19 is a sectioned view showing an attaching plate in the ninth embodiment of the present invention.

FIG. 19 shows an attaching plate in the ninth embodiment of the present invention.

According to this embodiment, in the eighth embodiment shown in FIG. 15, by using two spacers 155, three rubber sheets 154 as hollow elastic discs are fixed at predetermined intervals. Also, in this embodiment, by holding the guide tube part 3 with three rubber sheets, the holding function is made larger. Also, in this embodiment, no fitting bar is provided (needless to say, it may be provided).

Figure 20:
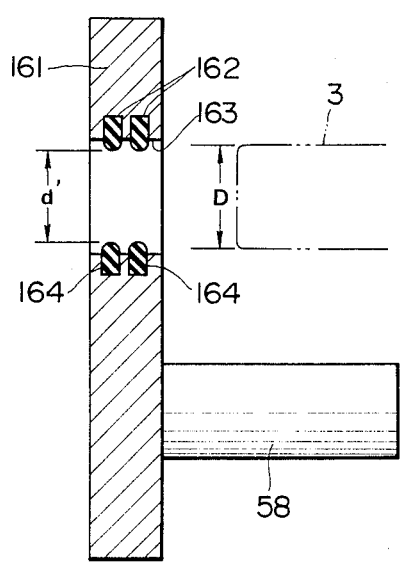
FIG. 20 is a sectioned view showing an attaching plate in the tenth embodiment of the present invention.

FIG. 20 shows an attaching plate 161 in the tenth embodiment of the present invention.

According to this tenth embodiment, for example, in FIG. 15, the hollow disc-shaped rubber sheets 154 are not used but O-rings 162 are used. These O-rings 162 are provided with two ring-shaped recesses 164 on the wall surface of a through hole 163 of the attaching plate 161. The O-rings 162 are fitted in the respective recesses 164.

The inside diameter of the above mentioned through hole 163 is made somewhat larger than the outside diameter D of the guide tube part 3 and the inside diameter d' of the O-ring 162 fitted in the recess 164 is made somewhat smaller than the outside diameter D of the guide tube part 3. The operation and effect of this tenth embodiment are substantially the same as of the above mentioned ninth embodiment but the formation is simpler than of the ninth embodiment.

Figure 21:
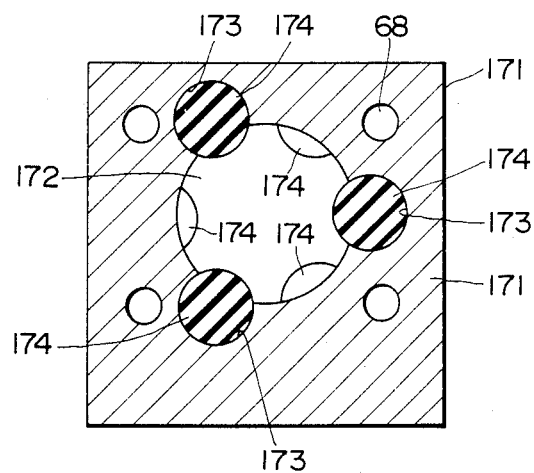
FIG. 21 is a sectioned view showing an attaching plate in the eleventh embodiment of the present invention.

FIG. 21 shows an attaching plate 171 in the eleventh embodiment of the present invention.

In this embodiment, for example, three concave spherical recesses 173 larger than hemispheres are formed in the inner peripheral direction of a through hole 172 formed in the attaching plate 171 and contain respectively elastic balls 174. The elastic balls 174 project toward the center of the through hole 172 and the diameter of the circle internally contacting these projecting parts is made smaller than the outside diameter of the guide tube part 3. The inside diameter of the through hole 172 is somewhat larger than the outside diameter of the guide tube part 3. The same as the above mentioned recesses 173 are formed also in the thickness direction of the through hole 172 and contain respectively the elastic balls 174.

The numbers of the above mentioned recesses 173 and elastic balls 174 are not limited to those shown in FIG. 21 and the recess 173 is not limited to be spherical.

By the way, the attaching plates of the above described embodiment may be overlapped.

A different embodiment can be formed by partly combining the above described respective embodiments. Further, in the embodiment shown in FIG. 13, the connecting bar 141 may be provided on the attaching plate 62 side and the fitting member 142 may be provided on the arm 57 side. The thus replaced embodiment also belongs to the present invention.

By the way, in the above described respective embodiments, the guide tube part 3 of the assisting means 2 as of an industrial endoscope apparatus can be elastically pressed in the outside diameter so as to be held but the present invention can be applied even to the case of pressing and holding the scope insertion part 11 of the industrial endoscope 5 itself (as an industrial endoscope apparatus) without using the assisting means 2.

What is claimed is:

1. An endoscope apparatus holding apparatus comprising:
    an endoscope provided with an elongate insertion part, an observing means and illuminating light emitting means housed on the tip side of said insertion part and a curving operation means provided on the base side of said insertion part and operating to curve a curvable part formed near the tip of said insertion part;
    an endoscope insertion assisting means provided with a guide tube part having a hollow path capable of inserting the insertion part of said endoscope and a holding means formed on the base side of said guide tube part and removably holding said endoscope;
    an apparatus fitting means to at least one endoscope apparatus;
    an attaching means capable of being detachably attached to an object to be inspected; and
    a distance adjusting means capable of varying the distance between said attaching means and said fitting means, wherein said distance adjusting means and said attaching means are separate from each other and a removable fitting means is formed therebetween, and further wherein said fitting means includes gripping pieces attached to one of said distance adjusting means and said attaching means and a bar-shaped member attached to the other of said distance adjusting means and said attaching means and gripped by said gripping pieces.

2. An endoscope apparatus holding apparatus according to claim 1 wherein said distance adjusting means and said attaching means are made integral with each other.

3. An endoscope apparatus holding apparatus comprising:
    an endoscope provided with an elongate insertion part, an observing means and illuminating light emitting means housed on the tip side of said insertion part and a curving operation means provided on the base side of said insertion part and operating to curve a curvable part formed near the tip of said insertion part;
    an endoscope insertion assisting means provided with a guide tube part having a hollow path capable of inserting the insertion part of said endoscope and a holding means formed on the base side of said guide tube part and removably holding said endoscope;
    an apparatus fitting means to at least one endoscope apparatus;
    an attaching means capable of being detachably attached to an object to be inspected; and
    a distance adjusting means capable of varying the distance between said attaching means and said fitting means, wherein said distance adjusting means and said attaching means are separate from each other and a removable fitting means is formed therebetween, and further wherein said fitting means includes a bar-shaped end part attached to one of said distance adjusting means and said attaching means, a hole part which is provided in the other of said distance adjusting means and said attaching means and with which said bar-shaped end part can be engaged, and a fixing screw fixing the bar-shaped end part engaged with said hole part.

4. An endoscope apparatus holding apparatus according to claim 1 wherein said bar-shaped member is variable in the length.

5. An endoscope apparatus holding apparatus according to claim 1 wherein said bar-shaped member is rotatable around its base.

6. An endoscope apparatus holding apparatus according to claim 1 or 2 wherein said distance adjusting means is made by bendably pivoting a plurality of arms in the connecting parts.

7. An endoscope apparatus holding apparatus according to claim 1 or 2 wherein said distance adjusting means comprises a pipe-shaped member and a pipe-shaped member fitted and slid within said pipe-shaped member to vary the entire length.

8. An endoscope apparatus holding apparatus according to claim 1 or 2 wherein said attaching means is fixed with screws to an attaching part of an object to be inspected.

9. An endoscope apparatus holding apparatus according to claim 8 wherein said attaching means has a hole part communicating with an observing hole of an object to be inspected.

10. An endoscope apparatus holding apparatus according to claim 9 wherein said attaching means is provided in the hole part with a positioning member by which a movement regulating force will act on the outer peripheral surface of said guide tube part in case said guide tube part is inserted into said hole part.

11. An endoscope apparatus holding apparatus according to claim 10 wherein said positioning member is formed of an elastic member of an effective inside diameter somewhat smaller than the outside diameter of said guide tube part.

12. An endoscope apparatus holding apparatus according to claim 11 wherein said positioning member is formed of a plurality of said elastic members.

13. An endoscope apparatus holding apparatus according to claim 12 wherein said elastic member is formed of an O-ring.

14. An endoscope apparatus holding apparatus according to claim 12 wherein said elastic member is formed of a rubber sheet.

15. An endoscope apparatus holding apparatus according to claim 14 wherein the hole forming the effective inside diameter of said rubber sheet is circular.

16. An endoscope apparatus holding apparatus according to claim 14 wherein the hole forming the effective inside diameter of said rubber sheet is of a circular form provided with cruciform incisions.

17. An endoscope apparatus holding apparatus according to claim 14 wherein the hole forming the effective inside diameter of said rubber sheet is of a circular form provided with many radial incisions.

* * * * *